Figure 1:
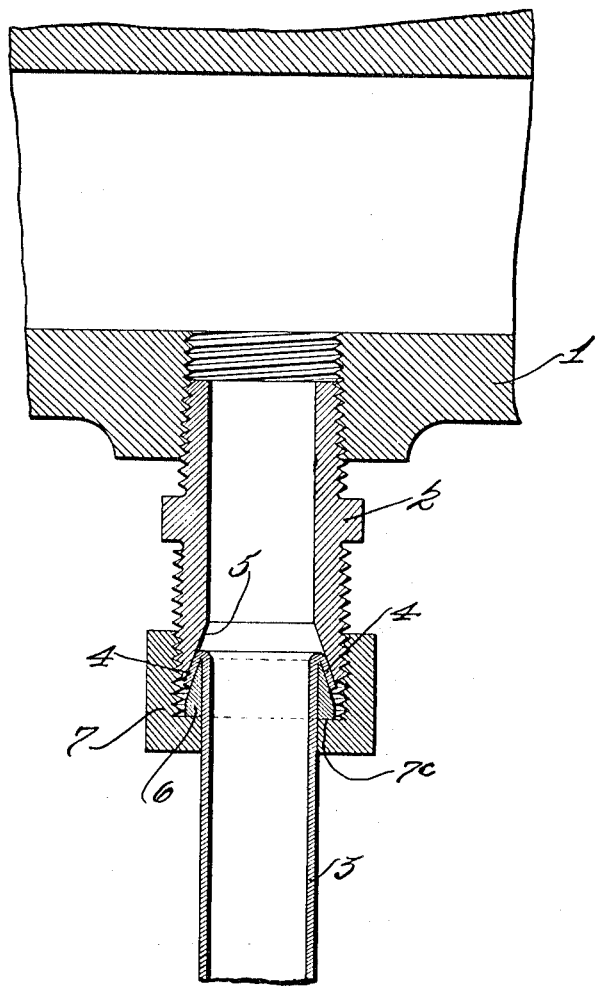

R. R. ROW.
PIPE JOINT AND THE LIKE.
APPLICATION FILED JAN. 23, 1911.

1,020,929.

Patented Mar. 19, 1912.
2 SHEETS—SHEET 1.

Witnesses:
C. A. Jarvis
Geo. F. Wheelock

Inventor
Reuben R. Row.
by Newell & Neal
Attorneys

R. R. ROW.
PIPE JOINT AND THE LIKE.
APPLICATION FILED JAN. 23, 1911.
1,020,929.
Patented Mar. 19, 1912.
2 SHEETS—SHEET 2.
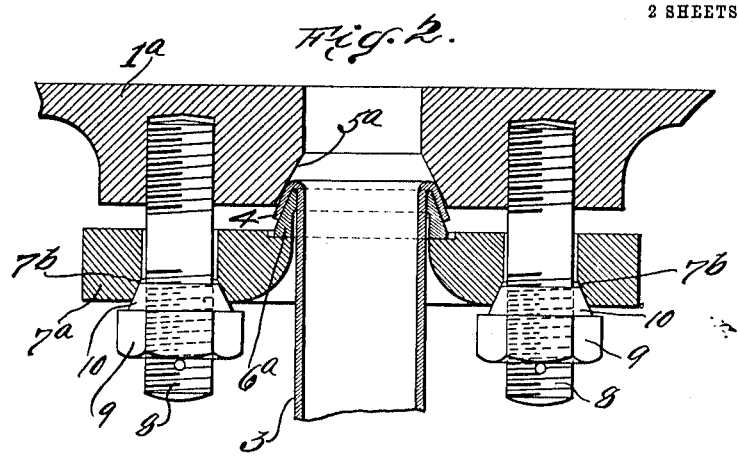
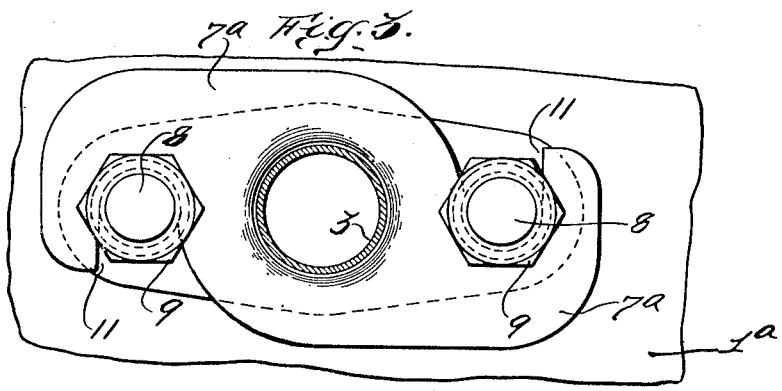
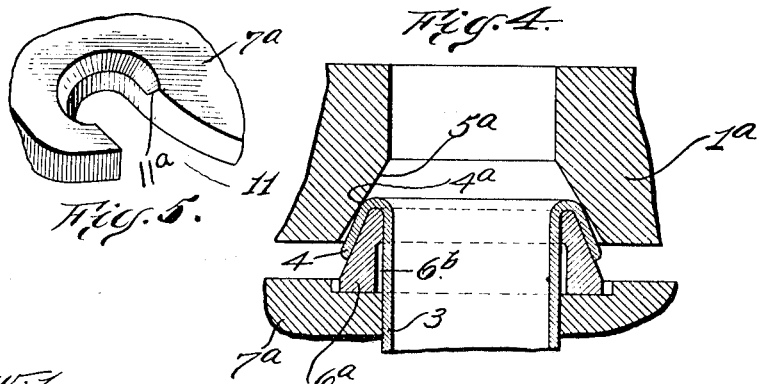
Witnesses:
C. A. Jarvis
Geo. L. Wheelock
Inventor:
Reuben R. Row
by Newell & Neal
Attorneys.

UNITED STATES PATENT OFFICE.

REUBEN R. ROW, OF JERSEY CITY, NEW JERSEY, ASSIGNOR TO THE GRISCOM-SPENCER COMPANY, A CORPORATION OF NEW JERSEY.

PIPE-JOINT AND THE LIKE.

1,020,929.   Specification of Letters Patent.   Patented Mar. 19, 1912.

Application filed January 23, 1911. Serial No. 604,273.

*To all whom it may concern:*

Be it known that I, REUBEN R. ROW, a citizen of the United States, residing at Jersey City, county of Hudson, and State of New Jersey, have invented certain new and useful Improvements in Pipe-Joints and the Like, of which the following is a clear, full, and exact description.

This invention relates to a coupling or union for either joining the ends of two pipes together or for securing the end of a pipe or similar member into any other opposed fitting such as a boiler plate or the like.

In my improvement I have provided a construction which will lock the end of the pipe in an absolutely tight joint, and yet be so arranged that it may be easily disassembled. One form of my device is also designed particularly for the connections of pipes in feed water heaters and boilers, in which the pipes and their joints are exposed to a high pressure and temperature, and in this form of my device there is provided a construction whereby the joint may be absolutely tight under all conditions and yet may have room to expand under the influence of heat without distorting the pipe to disturb the flow of water therethrough.

An improved feature of the joint which I have herein shown in one of my modifications, lies in having an interposed portion of turned-over soft metal between the opposed beveled faces of the fittings, and in having said beveled faces of different inclination to provide a small edge contact thus allowing the interposed portion of soft metal to expand while still keeping the joint together, and affording a tight joint even if the pipe and the socket are not in exact axial alinement.

My invention also consists of various other features of improvement which will be obvious in the following description, but I do not wish my invention to be limited to the particular construction shown, as it may be embodied in all of the various forms broadly defined in the appended claims.

In the preferred embodiment of my invention shown in the drawings Figure 1 is a section of a pipe end showing one form of coupling connection; Fig. 2 shows in section a modified form of coupling in which the joint is expansible; Fig. 3 is a plan view of Fig. 2 showing the coupling member in plan; Fig. 4 is an enlarged detail section of the joint of Fig. 2 showing more clearly the small edge contact of the pipe and opposed fitting; and Fig. 5 is a fragmentary perspective of the locking recess.

Referring more particularly to the drawing, 1 indicates a heating manifold of a feed water heater having any suitable spud or opposed fitting 2 screw connected therewith. The lower end of the spud 2 is interiorly beveled as shown to form a socket 5, adapted to receive the end of the pipe 3. Pipe 3 has mounted thereon near its end an encircling clamping ring 6 which is wedge shaped in cross section and over which as shown in Fig. 1, the end of the pipe 3 is turned backward upon itself. The turned back end therefore of pipe 3 forms a tapered portion 4 which fits snugly in the beveled socket of the spud, and any suitable coupling device or follower may be employed to engage the clamping ring 6 to draw it and the end of pipe 3 within the socket 5 of the spud 2 and effect a tight joint. As shown in Fig. 1, the coupling member may consist of an ordinary hexagonal nut 7, screw threaded on the spud 2, and having a shoulder $7^c$ for engaging the rear side of the clamping ring 6.

In the modification shown in Figs. 2, 3 and 4 I have shown the pipe end 3 as fitted directly upon the tube sheet or header $1^a$ of a boiler, and I have also provided means whereby the joint may expand under the influence of heat without distorting pipe 3. This expansive feature is provided for by means more clearly shown in the enlarged detail section Fig. 4, in which the clamping ring is recessed on the inside of its thicker portion at $6^b$ to afford a clearance between this portion and the exterior of pipe 3. The inclination of the beveled socket $5^a$ in the tube sheet is also made slightly more abrupt than the inclination of the tapered end 4 of the pipe 3, whereby there is a small edge contact at $4^a$. By this construction it is obvious that when this joint is exposed to high temperature, the thicker portion $6^a$ of the wedge ring expands to a greater extent than the thin portion, and both takes up the clearance at $6^b$ and also forces the tapered end 4 of pipe 3 into snug contact with the interiorly beveled socket 5ª. If there were no recess at 6ᵇ adjacent the thicker portion of the wedge shaped ring 6ª, the pipe 3 might be distorted by the expanding of the ring at this point, and it is to obviate such a contingency that this construction is designed. Furthermore the small edge contact upon the beveled side walls of the socket intermediate the ends thereof affords a tight packless joint even if the pipe and the socket are not in exact axial alinement. Also in Figs. 2, 3, 4 and 5, I have shown a modified form of coupling member 7ª for retaining the clamping ring 6ª in position and drawing it with the pipe 3 tightly up into the socket of the opposed fitting. This coupling member 7ª consists of a dog-eared plate having a central opening through which the pipe 3 extends. At opposite sides of this central opening are disposed open-ended recesses 11 facing in opposite directions. Stud bolts 8 screw threaded into the tube sheet 1ª extend through these slots and have nuts 9 at their outer ends for tightly clamping the plate 7ª in position and causing it to draw the clamping ring 6ª and pipe 3 tightly into the socket 5ª. The inner surface of said coupling member 7ª bears on the thicker end 6ª of said wedge ring and when the said end expands it moves upon and in contact with said surface. The recesses 11 of the plate 7ª are preferably chamfered to a point 11ª adjacent the mouth whereby retaining shoulders are formed at these points 11ª. The nuts 9 are formed with tapered faces 10 which by engaging these shoulders 11ª prevent the withdrawal of the bolts from the recess when the nuts are screwed down, but upon a slight loosening of the nuts the plate 7ª may be swung slightly around its center to be disengaged entirely from the bolts 8 and thus release the clamping ring and uncouple the pipe. It is obvious that this latter form of locking and coupling means is more convenient and quicker in operation than that shown in Fig. 1 since the nuts 9 need only be given part of a turn whereas in Fig. 1 the nut 7 must be completely unscrewed from its spud 2 to uncouple the pipe. It is also obvious that many other forms of coupling devices might be employed to engage the clamping ring 6 and draw it with its turned over portion of pipe into an opposed fitting without departing from the spirit of the present invention as hereinafter claimed.

It will be observed that the essential parts of my construction which are exposed to wear, are separable so that they may be easily replaced when injured or worn out. Furthermore, when the turned over end 4 of the pipe 3 is worn, broken or does not give a good seating surface, a new joint is easily made by cutting off the worn end of the pipe and upsetting a fresh portion 4 over the clamping ring.

What I claim as new is:—

1. A joint comprising in combination a pipe, a wedge ring thereon, the end of said pipe being turned back on itself over said ring, an opposed fitting having a beveled socket to receive said pipe end, a coupling member surrounding said pipe and engaging the rear side of said wedge ring, means for securing said coupling member to the opposed fitting comprising oppositely disposed recesses at each side of said coupling member, said recesses being partially chamfered to form shoulders at their mouths, and stud bolts having retaining nuts with beveled faces for engaging said chamfered slots behind said shoulders and for in turn forcing the said coupling member against said wedge ring and said pipe end against said fitting.

2. A quickly detachable and replaceable pipe joint comprising a fitting having a beveled socket, a pipe having its end turned back upon itself to form a flange having the shape of a cone-frustum and being of such diameter that its forward edge, when forced into wedging engagement with the socket, contacts the side walls thereof intermediate the ends of the beveled portion to form a tight packless joint, and a follower adapted to force the said forward edge lengthwise of the pipe into such wedging engagement, substantially as described.

3. A quickly detachable and replaceable pipe joint, comprising a fitting having a beveled socket, a pipe, a tubular cone-frustum surrounding the pipe, the end of the pipe being turned back to embrace the cone-frustum and hold it in fixed relation to the end of the pipe and being adapted upon being forced into wedging engagement with the socket to make a tight packless joint, and a follower adapted to force the turned-over end portion into wedging engagement with the socket, substantially as described.

4. A quickly detachable and replaceable pipe joint, comprising a fitting having a beveled socket, a pipe, a tubular cone-frustum surrounding the pipe, the base portion of said cone-frustum being of greater internal diameter than the thin edge portion, the end of the pipe being turned back over the thin edge of the cone-frustum, and adapted upon being forced into wedging engagement with the socket to make a tight packless joint, and a follower surrounding and freely rotatable with respect to the pipe and adapted to force the turned-over end thereof into such wedging engagement with the socket; substantially as described.

5. A quickly detachable and replaceable pipe joint, comprising a fitting having a beveled socket, a pipe having its end turned back upon itself to form a flange having the shape of a cone-frustum the sides of which subtend a less angle than the sides of the socket, the flanged end of the pipe being of such diameter that its forward edge, when forced into wedging engagement with the socket, contacts the side walls thereof intermediate the ends of the beveled portion to form a tight packless joint without requiring exact alinement of the pipe and socket, and a follower adapted to force said forward edge into such wedging engagement with the socket, substantially as described.

6. A quickly detachable and replaceable pipe joint, comprising a fitting having a beveled socket, a pipe having its end turned back upon itself to form a flange having the shape of a cone-frustum the sides of which subtend a less angle than the sides of the socket, the flanged ends of the pipe being of such diameter that its forward edge, when forced into wedging engagement with the socket, contacts the side walls thereof intermediate the ends of the beveled portion to form a tight packless joint without requiring exact alinement of the pipe and socket, and a follower adapted to force said forward edge into such wedging engagement with the socket, said follower having oppositely disposed recesses on the two sides of its center, and means for drawing up the follower comprising stud bolts positioned to be embraced by said recesses and having retaining nuts for engaging the follower, substantially as described.

Signed at New York, N. Y., this 12 day of January 1911.

REUBEN R. ROW.

Witnesses:
  BEATRICE MIRVIS,
  ABRAM BERNSTEEN.

Copies of this patent may be obtained for five cents each, by addressing the "Commissioner of Patents, Washington, D. C."